United States Patent [19]
Zeller, III et al.

[11] Patent Number: 5,567,406
[45] Date of Patent: Oct. 22, 1996

[54] MANUFACTURING CLEAR POTASSIUM SULFITE

[76] Inventors: Robert L. Zeller, III, 425 Hawthorne Pl., Youngstown, N.Y. 14174; David L. Johnson, 51 Saber La., Williamsville, N.Y. 14221

[21] Appl. No.: 439,243

[22] Filed: May 11, 1995

[51] Int. Cl.$^6$ .................................................. C01B 17/42
[52] U.S. Cl. ...................... 423/519.2; 423/264; 423/265; 423/519
[58] Field of Search ............................... 423/519, 519.2, 423/641, 642, 183, 264, 265

[56] References Cited

PUBLICATIONS

Comprehensive Inorganic Chemistry, vol. I, pp. 505–506 Pergamon Press NY NY (1973).

Inorganic Synthesis, vol. II, pp. 166–167, McGraw Hill NY NY 1946.

*Primary Examiner*—Gary P. Straub
*Attorney, Agent, or Firm*—Richard D. Fuerle

[57]   ABSTRACT

Disclosed is a method of manufacturing potassium sulfite from a potassium hydroxide feedstock. A feedstock is tested for the presence of iron and, if the feedstock contains less than 0.3 ppm of iron, it is reacted with sulfur dioxide in an aqueous solution to form potassium sulfite. Alternatively, potassium sulfite that has a yellow or brownish color can be decolorized by adding about 0.02 to about 0.8 wt % hypophosphorous acid to it.

6 Claims, No Drawings

MANUFACTURING CLEAR POTASSIUM SULFITE

BACKGROUND OF THE INVENTION

This invention relates to a method of making an aqueous solution of potassium sulfite which has an APHA number of less than 40. In particular, it relates to manufacturing potassium sulfite from potassium hydroxide which contains a low concentration of iron, either because it was selected for low iron or because the iron was inactivated with hypophosphorous acid.

Potassium sulfite is manufactured by reacting potassium hydroxide in solution with liquid sulfur dioxide. The resulting solution of potassium sulfite is sometimes clear and is sometimes yellow or brownish in color. Until now, the cause of this yellow or brownish color was unknown.

Potassium sulfite is sold for use in a variety of applications. One application is in a developing solution for photographic negatives. While potassium sulfite that has the yellow or brownish color does not result in lower quality pictures, nevertheless, customers who use developing solutions prefer clear solutions and will purchase a clear developer in preference to a colored developer. In order to be acceptable for use as a developing solution the potassium sulfite solution should have an APHA (American Public Health Association) number that does not exceed 40 and is preferably less than or equal to 10 (based on a 45 wt % solution of $K_2SO_3$).

In order to satisfy the customers without discarding or wasting yellow or brownish potassium sulfite, it has been the practice in the industry to segregate high color potassium sulfite for customers which have applications not related to photographic developing (e.g., chlorine scrubbing solutions).

SUMMARY OF THE INVENTION

We have discovered that the reason potassium sulfite is produced with a yellow or brownish color is that the potassium hydroxide solution from which it is made contains ppm quantities of iron. We have found that if feedstocks of potassium hydroxide are tested for iron and only those feedstocks that contain less than 0.3 ppm iron are used to make potassium sulfite, the potassium sulfite solution is clear and does not have a yellow or brownish color.

We have further found that a solution of yellow or brownish potassium sulfite can be clarified by the addition of a small amount of hypophosphorous acid to the solution. It is believed that the presence of hypophosphorous acid in the potassium sulfite does not adversely affect its properties as a developing solution for photography.

DESCRIPTION OF THE PREFERRED EMBODIMENTS

Potassium sulfite is manufactured from potassium hydroxide according to the equation:

$$2KOH + SO_2 \rightarrow K_2SO_3 + H_2O$$

The sulfur dioxide is added as a liquid to an aqueous solution of the potassium hydroxide. This reaction is exothermic and cooling is usually necessary.

Although any potassium hydroxide concentration can be used, a typical feedstock of potassium hydroxide is 45 wt % KOH and contains 0.3 to 2 ppm iron, though some feedstocks contain less iron. We have discovered that it is the presence of iron in the potassium hydroxide solution that is responsible for the yellow or brownish color of the resulting potassium sulfite. Feedstocks having low iron concentrations produce potassium sulfite having APHA numbers under 40. The preferred method of producing colorless potassium sulfite is therefore to select only those feedstocks of potassium hydroxide which contain less than 0.3 ppm of iron, and preferably less than 0.1 ppm of iron (based on a 45 wt % solution), for use in making potassium sulfite. (The iron content of a potassium hydroxide feedstock can be determined by analyzing or testing the feedstock using inductively coupled argon plasma spectroscopy, the thiocyanate colorimetric method, atomic absorption spectroscopy, or another appropriate analytical technique.) Feedstocks that contain higher iron concentrations can be used for other purposes where iron concentration is not important.

We have also discovered how a KOH feedstock containing more than 0.1 ppm iron or more than 0.3 ppm iron can be used to make colorless potassium sulfite. To the yellow or brownish colored potassium sulfite made from that feedstock is added about 0.02 to about 0.8 wt % hypophosphorous acid (based on solution weight); preferably, about 0.05 to about 0.5 wt % hypophosphorous acid is added. The hypophosphorous acid is typically used as a 50 wt % solution and it should be added at room temperature while stirring. The addition of hypophosphorous acid can clarify the solution of potassium sulfite to an APHA number of less than 40.

The following examples further illustrate this invention.

EXAMPLE 1 (COMPARATIVE)

In order to determine the cause of the yellow or brownish color in the potassium sulfite, a number of experiments were performed. Very pure potassium hydroxide was reacted as a 45 wt % solution with liquid sulfur dioxide at a variety of temperatures. The processing temperature had no effect on the resulting color of the potassium sulfite, which was clear.

Solutions of colored and clear potassium sulfite were aged for several months. Aging had no effect on the color of the potassium sulfite.

Yellow or brownish potassium sulfite was filtered through 2 micron filters. The potassium sulfite color did not change.

EXAMPLE 2

The purpose of this example is to show that ferrous (FeII) and ferric (FeIII) both produce APHA color at comparable levels in $K_2SO_3$ solutions.

A 45 wt % aqueous solution of $K_2SO_3$ was produced by reacting pure KOH, $SO_2$, and $H_2O$ in the proper proportions and conditions. This solution contained <0.6 ppm Fe (total); its color was measured to be 10 APHA. A 100 ppm Fe(II) standard was prepared by adding 0.0702 g $Fe(NH_4)_2(SO_4)_2 \cdot 6H_2O$ to a 100 ml volumetric flask and diluting to volume with water. A 100 ppm Fe(III) standard was prepared by adding 0.0869 g $FeNH_4(SO_4)_2 \cdot 12H_2O$ to a 100 ml volumetric flask and diluting to volume with water.

One hundred ml of the 45% $K_2SO_3$ solution was transferred to a 100 ml beaker containing a stir bar. This solution was transferred to the APHA color tube and the color was measured. This solution was then carefully transferred back to the beaker. While mixing, 0.10 ml of the 100 ppm Fe(II) standard was added. This solution was again transferred back to the APHA color tube and another color measurement was made. This procedure was repeated until 1.5 ml of 100 ppm of the Fe(II) solution had been added. The entire test was repeated using fresh 45 wt % K₂SO₃ solution and the 100 ppm Fe(III) standard.

The following table gives the results.

| ppm | APHA Color | |
|---|---|---|
| | Fe(II) | Fe(III) |
| 0 | 10 | 10 |
| 0.1 | 10 | 10 |
| 0.2 | 10 | 12.5 |
| 0.3 | 12.5 | 12.5 |
| 0.4 | 17.5 | 15 |
| 0.5 | 17.5 | 25 |
| 0.6 | 25 | 25 |
| 0.7 | 25 | 30 |
| 0.8 | 30 | 30 |
| 0.9 | 30 | 40 |
| 1.0 | 30 | 40 |
| 1.1 | 30 | 50 |
| 1.2 | 40 | 50 |
| 1.3 | 40 | 50 |
| 1.4 | 40 | 50 |
| 1.5 | 50 | 50 |

The table shows that the presence of either Fe(II) or Fe(III) in a potassium sulfite solution increases its APHA color.

EXAMPLE 3

The purpose of this example is to demonstrate that hypophosphorous acid can decrease the APHA color in potassium sulfite solutions, while a simple acid or a hypophosphite salt does not.

A 45 wt % $K_2SO_3$ solution was made by reacting KOH, $SO_2$, and $H_2O$ in the proper proportions and conditions. This solution contained <0.6 ppm Fe (total) and was measured to be 10 APHA. The solution was spiked with 100 ppm Fe(II) solution (described in Example 3) to produce a solution containing 1.5 ppm Fe(II).

Three solutions were added to the potassium sulfite solution to determine their impact on the APHA color. A 50 wt % $H_3PO_2$ solution, a 50 wt % $NaH_2PO_2.H_2O$ solution, and a 37.5 wt % HCl solution were used as additives.

100 ml of the 45 wt % $K_2SO_3$ solution was transferred to a 100 ml beaker containing a stir bar. This solution was transferred to the APHA color tube and the color was measured. This solution was then carefully transferred back to the beaker. While mixing, 0.10 ml of the 50 wt % $H_3PO_2$ solution was added. This solution was again transferred back to the APHA color tube and another color measurement was made. This procedure was repeated until 1.0 ml of the 50 wt % $H_3PO_2$ solution had been added. The entire test was conducted again using fresh 45 wt % $K_2SO_3$ solution and either the 50 wt % $NaH_2PO_2.H_2O$ solution or the 37.5 wt % HCl solution.

The following table gives the results.

| wt % Additive | APHA Color | | |
|---|---|---|---|
| | 50 wt % H₃PO₂ | 50 wt % NaH₂PO₂.H₂O | 37.5 wt % HCl |
| 0.0 | 50 | 50 | 60 |
| 0.1 | 50 | 50 | 60 |
| 0.2 | 40 | 50 | 60 |
| 0.3 | 20 | 50 | 70 |
| 0.4 | 12.5 | 50 | 70 |
| 0.5 | 7.5 | 50 | 70 |
| 0.6 | | 60 | 70 |
| 0.8 | | 60 | 70 |
| 1.0 | | 60 | 70 |

This example shows that hypophosphorous acid is effective in removing APHA color, but that the components of hypophosphorous acid (i.e., $H^+$ and $H_2PO_2$) separately are not effective.

EXAMPLE 4

Approximately 3.5 kg of high color 45 wt % potassium sulfite solution was collected and split into 500 g size samples. To each sample, a specified amount of 50 wt % hypophosphorous acid (HPA) was added while mixing.

The following table gives the results.

| Wt % of 50 Wt % HPA | APHA Color | Assay wt % | pH |
|---|---|---|---|
| Specification | <40 | 44–46 | 9.0–9.5 |
| 0.00 | 40 | 45.3 | 9.35 |
| 0.02 | 40 | 45.4 | 9.29 |
| 0.09 | 25 | 45.5 | 9.05 |
| 0.10 | 10 | 45.2 | 9.19 |
| 0.20 | 10 | 45.0 | 9.10 |
| 1.00 | 10 | 44.6 | 8.72 |
| 1.97 | 10 | 44.1 | 8.49 |

The table shows that 0.10 wt % of the 50 wt % HPA solution was required to decrease 40 APHA color to 10. This example demonstrates that the APHA color of potassium sulfite can be substantially reduced by the addition of small amounts of hypophosphorous acid. It is also important to note that important specifications, such as assay (wt % $K_2SO_3$) and pH, did not change significantly.

We claim:

1. A method of making an aqueous solution of potassium sulfite having an APHA number less than 40 from a potassium hydroxide feedstock that contains more than 0.1 ppm iron (based on a 45 wt % KOH solution) comprising:

(A) reacting said potassium hydroxide with sulfur dioxide in an aqueous solution to produce an aqueous solution of potassium sulfite; and (B) adding about 0.02 to about 0.8 wt % hypophosphorous acid to said aqueous solution of potassium sulfite.

2. A method according to claim 1 wherein the amount of hypophosphorous acid added is about 0.05 to about 0.5 wt %.

3. A method according to claim 1 wherein said hypophosphorous acid is added slowly, with stirring, at room temperature.

4. A method according to claim 1 wherein said potassium hydroxide is in a 45 wt % aqueous solution.

5. A method according to claim 1 wherein said potassium hydroxide feedstock contains more than 0.3 ppm iron (based on a 45 wt % solution).

6. A method according to claim 1 wherein said aqueous solution of potassium sulfite has an APHA number less than 10.

* * * * *